United States Patent [19]

Mattson

[11] Patent Number: 4,972,865

[45] Date of Patent: Nov. 27, 1990

[54] ANTI-SPILLAGE AND ANTI-DRIP DEVICE

[76] Inventor: Roy D. Mattson, 2194 Deer Pass Trail, White Bear Lake, Minn. 55110

[21] Appl. No.: 390,225

[22] Filed: Aug. 4, 1989

[51] Int. Cl.[5] .............................................. F16K 24/00

[52] U.S. Cl. ........................................ 137/2; 137/199; 55/482

[58] Field of Search .................... 137/197, 199, 587, 2; 55/308, 307, 482, 522, 523

[56] References Cited

U.S. PATENT DOCUMENTS

| | | | |
|---|---|---|---|
| 1,464,110 | 8/1923 | Ramsey | 137/197 X |
| 2,634,028 | 4/1953 | Brown | 137/197 X |
| 3,326,230 | 6/1967 | Frank | 137/199 |
| 3,719,197 | 3/1973 | Pannier | 137/199 X |
| 4,030,495 | 6/1977 | Virag | 137/197 X |
| 4,071,040 | 1/1978 | Moriarty | 137/199 |
| 4,512,771 | 4/1985 | Norton | 55/482 |
| 4,790,349 | 12/1988 | Harris | 137/587 |
| 4,877,152 | 10/1989 | Whitley | 137/587 X |

*Primary Examiner*—Alan Cohan

*Attorney, Agent, or Firm*—Jacobson and Johnson

[57] ABSTRACT

Two or more relatively fine mesh screens are placed in a liquid flow path to allow gas or air or liquid under pressure to pass through but to prevent unpressurized liquid from flowing through. In one application the device may be attached to a vent opening of a liquid container to permit air into the container while preventing liquid from spilling out of the container through the vent opening. In another application the screens may be used in the flow path for liquid under pressure to prevent dripping of the liquid after the pressure has been removed.

14 Claims, 3 Drawing Sheets

ANTI-SPILLAGE AND ANTI-DRIP DEVICE

FIELD OF THE INVENTION

The invention is the discovery that placing two or more relatively fine mesh screens across a liquid flow path will allow gas or air (hereinafter usually air) or pressurized liquid to pass relatively easily through yet prevent unpressurized liquid from flowing through. In one application the screens are placed in a tube attached to the vent opening of a liquid container to allow air to flow into the container while preventing liquid from the container from spilling out through the vent hole if the container is tipped over or tilted too far. In another application the screens are placed in a hose or tube carrying pressurized liquid to prevent the liquid from dripping after the pressure is removed.

DESCRIPTION OF THE PRIOR ART

Dalton, Jr. U.S. Pat. No. 3,240,398, describes an anti-spillage device for a spray gun cup in the form of a tube running from the vent opening in the cap circuitously partway around the underside of the top of the cap. One drawback of the Dalton device is that it becomes inoperable if the container is turned upside down, or close thereto, which is not unusual in some paint spray operations. Another drawback is that it depends in part upon the operator maintaining pressurized air past or through the gun nozzle at all times when the cup is tilted which the operator may fail or forget to do.

Lau, et al. U.S. Pat. No. 4,174,070, shows an upward extending looped tube attached to a vent opening in the cap of a spray gun cup. The Lau, et al. device will not prevent spillage when the cup is tilted almost upside down. Another drawback with both of the aforementioned patented devices is that they appear to work only when the vent hole is through the cap. Sometimes the vent opening may be through the side of the container above the normal untilted level of the fluid and neither of the aforementioned devices will prevent spillage in that case.

SUMMARY OF THE INVENTION

A hollow tube has two or more relatively fine mesh screens coaxially mounted within its bore with the mesh of the screens being of a degree which will permit air (or other gas) to pass relatively freely through the tube but which will prevent liquid from flowing through the tube past the screens. In an embodiment of the invention for one particular application one end of the tube is attached to the air vent opening of a liquid container and is permitted to pass through the tube into the container but any liquid which might otherwise spill out through the air vent when the container is tilted too far is prevented from spilling by not being able to flow past the screens. The vent opening can be in the cap of the container or through the side near the top, above the normal untilted level of the liquid. In another application the screens are placed in a tube or hose or the like which normally carries liquid under pressure. The screens allow the liquid to flow while the pressure is being applied but prevent any fluid remaining in the hose from dripping out the open end when pressure is removed.

DESCRIPTION OF THE PREFERRED EMBODIMENTS

Figure 1:
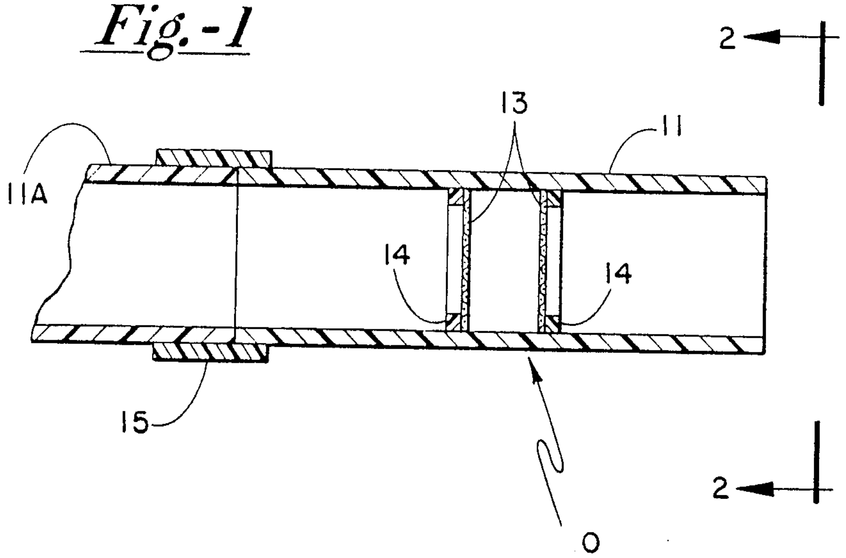
FIG. 1 is a sectioned view illustrating an embodiment of the invention.

An embodiment of the invention generally designated by reference numeral 10 comprises a tubular member 11 having a hollow bore 12 with a pair of relatively fine mesh circular screens 13 (assuming the bore 12 is circular) coaxially mounted by a pair of retaining rings 14 in bore 12 of tube 11. Retaining rings 14 are only used to hold screens 13 in place and can be eliminated if the screens 13 can be securely mounted within the tube 11 without the aid of retaining rings 14 provided the screens cover the entire flow path area of bore 12. The device 10 can be removably attached to another tube 11A which is merely an extension of tube 11, by a snug fitting sleeve 15 or in some other convenient fashion. This permits quick and easy removed of the device 10 in the event the screens 13 should become fouled or damaged so that they should be removed for cleaning or replacement. In some applications it has been found necessary, or preferable, to include additional (more than two) screens 13 within tube 11 to produce a more reliable anti-spill or anti-drip function. Air and pressurized liquid can pass relatively freely through screens 13 down bore 12 of tube 11 but unpressurized liquid which may enter one end of tube 11 is prevented from passing through the tube beyond screens 13. It has been found that there is a correlation between the degree of mesh of screens 13 and the viscosity and/or specific gravity of the liquid such that the higher the viscosity, the less fine the screen mesh need be in order to hold back the liquid flow. It has also been found that liquid flow stoppage can be enhanced by using more than two screens. Test results have indicated that the effectiveness of preventing spillage or dripping increases with the number of screens used. While the amount of space between screens may be a factor, investigation has not produced any strong evidence of a correlation between the effectiveness of flow stoppage and the spacing between the screens. Preliminary investigation indicates that the viscosity and/or specific gravity of the liquid and the mesh size of the screen are the most critical factors.

It should be understood that the device as described is intended to prevent unwanted spillage or dripping of liquid and is not directed toward stopping flow of liquid which is intended to flow through a tube or hose or the like under pressure. While some degree of pressure differential will likely always be present, even in the case of a liquid spill or drip, these pressures are only of an ambient nature, not produced by some outside or separate pressure source. Typically, a pair of screens 13 arranged in a $\frac{3}{4}$ inch I.D. tube 11 in the manner as illustrated in FIG. 1 having a mesh in the range of about seventeen microns (about 0.00067" openings) was found to hold back or prevent the flow through the tube of up to about thirty inches of water or about twelve inches of isopropyl alcohol with the tube vertical. Screens 13 can be made out of fabric or metal filaments typically, for example, a polyester filament. The main concern is that the screen material is not reactive with the liquid.

Figure 2:
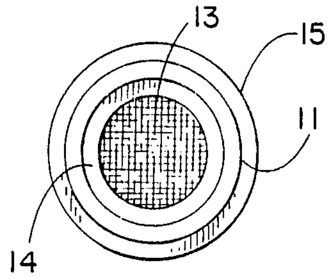
FIG. 2 is an end view of the FIG. 1 embodiment.
Figure 3:
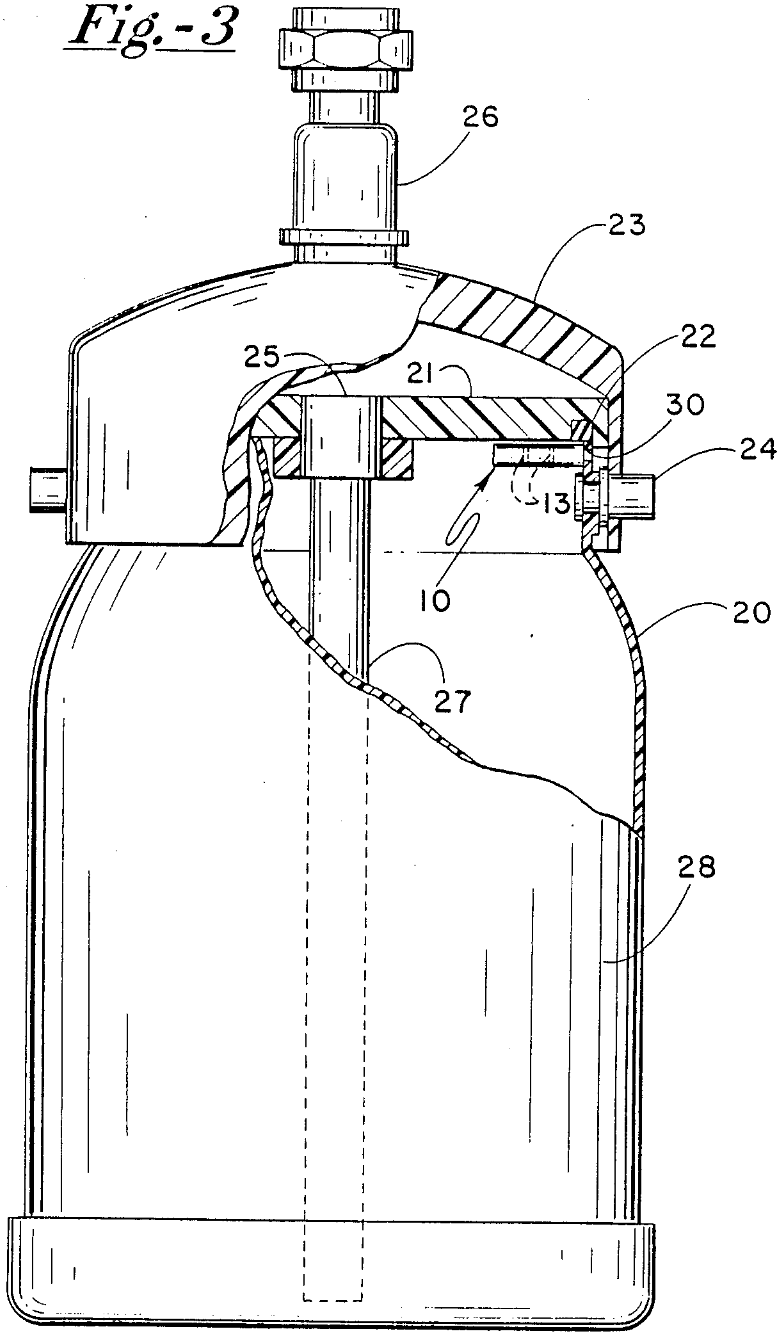
FIG. 3 illustrates one application of the invention with a liquid spray gun cup.

FIG. 3 illustrates one application of a preferred embodiment of the invention. Conventionally, the open top of a cup or jar container 20 is closed with a cap 21 which is sealed around the top edge of cup 20 by an annular seal 22 when handle or bridge 23 is swung to the upright position about its pivot points 24 on container 20. A normal outlet opening 25 through cap 21 is attached to a fitting 26 which extends above the cap and a tube 27 which extends downward into the liquid 28. A spray gun, not shown, is normally attached to the upper end of fitting 26. Container 20 may have a side air vent opening 30 just below the sealed cap 21. Used as a siphon cup, conventionally when the spray gun is triggered, air from the ambient atmosphere is drawn through vent opening 30 into the interior of container 20 and the liquid 28, which typically may be paint, is drawn up through tube 27 and fitting 26 and sprayed through a nozzle in the attached gun. Conventionally the gun is supplied with pressurized air from a suitable source to siphon liquid out of cup 20 and air is drawn from the atmosphere into vent opening 30. If the operator should tilt the cup 20 too far, or if it should get knocked over, some of the liquid 28 ordinarily would spill out of vent opening 30. To prevent this, anti-spillage device 10, such as illustrated in FIGS. 1 and 2, is attached inside the cup 20 to the vent opening 30. During normal operation air is allowed to enter the cup interior quite freely from the outside ambient atmosphere through vent opening 30 but in the event the container should be tilted too far or knocked over so that the level of the liquid reaches the level of the air vent opening, the screens prevent the reverse flow of liquid 28 out through air vent 30.

Figure 4:
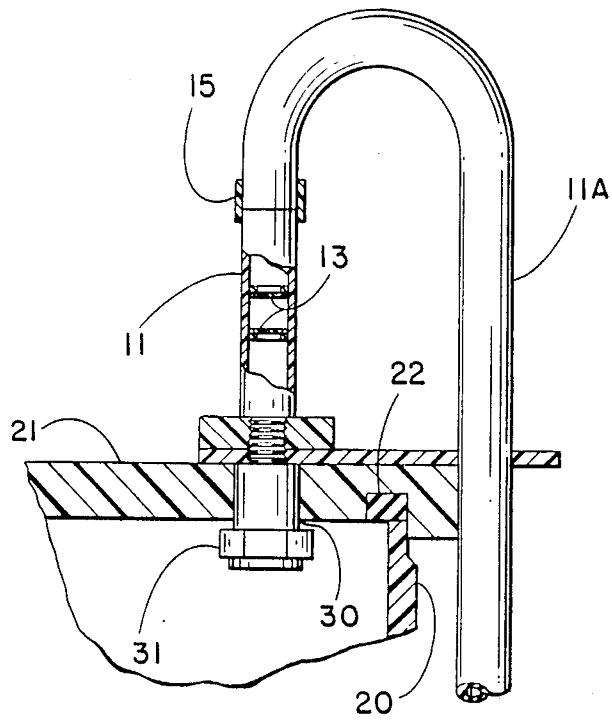
FIG. 4 illustrates another application of the invention with liquid spray gun cup.

In the case where the air vent opening 30 is through cap 21 of container 20, as illustrated in FIG. 4, one end of tubing 11 containing screens 13, as illustrated in FIGS. 1 and 2, may be attached internally to the vent opening (not shown) or may be attached by a suitable fitting, generally designated by reference numeral 31, to vent opening 30 outside container 20. Ambient air is permitted to flow relatively freely into the interior of container 20 but liquid from the container will be prevented from spilling onto the ground or other work area through vent opening 30 should cup 20 be tilted too far or topple over. In some spray gun applications, instead of the gun merely siphoning liquid out of the container, low pressure air is applied through tubing 11A into the interior of cup 20 through vent opening 30. The anti-spillage device attached to tubing 11A then functions, as described, to prevent flow of liquid out of vent opening 30 through tube 11 back to the pressure source through tube 11A in the event the container is tilted too far or falls over while the air pressure source is turned off.

While I am unable to give a rigorous scientific explanation for the anti-spillage and anti-dripping phenomenon that occurs, it appears that when the liquid reaches and wets the screens, it is prevented from continuing to flow through the tube past the screens by the entrapment of some of the liquid between two adjacent screens even if the screens are very close or touching one another.

In the applications illustrated in FIGS. 3 and 4, in the case in which low pressure air is applied into the cup through tube 11 and vent opening 30, generally the liquid which is trapped by the screens when the pressurized air is turned off will be forced back into the container when the pressurized air comes back on or may otherwise flow back into the container by tilting the container. However, it is prudent that the interior of the tube and the screens be cleaned quite promptly after use to prevent the trapped liquid, such as paint, from drying up within the tube and/or on the screens which could impair the air flow. Also, it may be necessary from time to time to remove used screens and replace them with new or newly cleaned screens.

Figure 5:
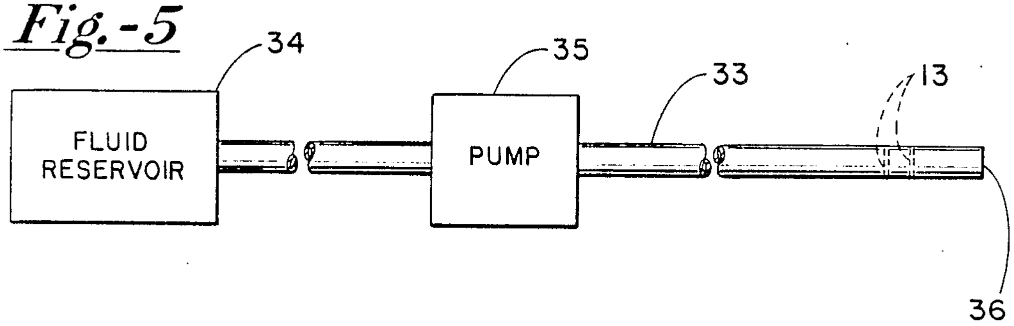
FIG. 5 illustrates yet another application of the invention.

In another application, see FIG. 5, a conduit 33 such as a hose or pipe, may normally be used for carrying liquid from a reservoir 34 pressurized by pump 35 to an outlet opening 36. Two or more screens 13 of the nature described herein when placed across the liquid flow path near the open outlet end 36 allow the pressurized liquid to flow quite easily through and out the outlet end but when the pressure is removed, i.e., pump 35 turned off, the flow is stopped immediately by screens 13 thereby eliminating dripping at the outlet end 36.

In addition to the test mentioned earlier hereinabove, two screens having about 230 mesh per inch, or about 0.0024 inch openings, made from fine polyester threads placed close to the bottom of a forty-two inch long, three-quarter inch I.D. vertical tube held back up to eleven inches of water and liquid latex paint having a specific gravity of about 1.38 up to the maximum of forty-two inches. As a result of these test, it appears that for each application some degree of experimentation may be necessary to determine the screen mesh size, tube (I.D.), the number of screens and, perhaps, the spacing between screens to obtain best results.

I claim

1. A device for preventing spilling or dripping of liquid, comprising:

multiple fine mesh screens placed in parallel across a liquid flow path, said screens characterized by having a mesh size allowing air or pressurized liquid to pass through but preventing unpressurized liquid from passing through.

2. The anti-spill anti-drip device described in claim 1 wherein the mesh size is in the order of about seventeen microns or less.

3. The device as decribed in claim 1 wherein the mesh size is proportional to the viscosity of the liquid.

4. In a system having a source of liquid, means for pressurizing the liquid and conduit means having a passageway for carrying the liquid to an open outlet end, the improvement comprising:

multiple fine mesh screens placed in parallel across the conduit passageway closely adjacent the open the outlet end of the conduit, said screens characterized by allowing pressurized liquid to pass through and preventing unpressurized liquid from passing through.

5. In combination:

a hollow tube for conveying air and liquid; and a plurality of fine mesh screens coaxially mounted within said tube, said screens characterized by allowing air to flow through said tube substantially unimpeded while at the same time preventing unpressurized liquid from flowing through said tube when the screens are wetted by the liquid.

6. A method for preventing spilling or dripping of liquid, comprising the steps of:

placing a plurality of screens coaxially across the entire area of the liquid flow path, said screens characterized by having a degree of mesh which allows the liquid at a pressure substantially above atmospheric pressure to pass through the screens and when wetted by the liquid prevents unpressurized liquid from passing through the screens.

7. A device for preventing spillage of liquid out an air vent opening of a container of liquid, said device comprising:

a hollow tubular member open at both ends coupled at one end to said vent opening for conveying air passing through said vent opening; and a plurality of mesh screens coaxially mounted within said tubular member, the mesh of said screens having a coarseness to top liquid from flowing through said tubular member without plugging up said screens thereby allowing air passing through said air vent to flow substantially unimpeded through said tubular member while the liquid flow is stopped.

8. The device as described in claim 7 wherein said tubular member is removably coupled to said vent opening.

9. The device as described in claim 7 wherein said tubular member is located outside the container.

10. The device as described in claim 7 wherein said tubular member is located inside the container.

11. The device as described in claim 7 wherein said plurality of screens comprises two screens.

12. The device as described in claim 7 wherein the coarseness of the screen mesh is directly proportional to the viscosity of the liquid in the container.

13. An anti-spillage device for the air vent opening of a container of liquid, comprising:

a hollow tubular member open at both ends coupled at one end to a liquid container air vent opening;

a plurality of screens coaxially mounted parallel to one another within said tubular member;

said screens entrapping a small amount of liquid between two adjacent screens to prevent liquid in said container from flowing through said tubular member while simultaneously permitting air to pass substantially unimpeded through said tubular member.

14. The anti-spillage device as described in claim 13. wherein the number of screens is proportional to the degree of coarseness of the screens.

* * * * *